Patented Dec. 19, 1944

2,365,363

UNITED STATES PATENT OFFICE 2,365,363

COMPOSITION FOR USE IN GRAINING INKS

Raymond A. Swain, Bellevue, Ky., assignor to Interchemical Corporation, New York, N. Y., a corporation of Ohio No Drawing. Application May 20, 1941, Serial No. 394,285

4 Claims. (Cl. 106—27)

This invention relates to the art of artificial wood graining, and it is particularly directed to new substances which are useful in the preparation of graining inks, and to graining inks containing these substances.

The usual method of reproducing grain patterns of fine woods on either cheap wood or metal is, first, to apply a base coat, or ground coat, to the surface to be "grained" which hides the true appearance of the surface and provides a background color for the grain design. This is printed with the grain pattern by means of a resilient roll bearing the graining ink in the desired pattern from contact with an intaglio cylinder. After the graining ink has dried, a covering of a clear varnish or resinous composition, tinted with a transparent color if desired, is applied to protect the printed graining and to provide a finish resembling genuine wood finishes. Sometimes, when applying an artificial grain to wood, the ground coat may be omitted and the graining ink applied directly to the bare wood.

Graining inks must have certain physical characteristics which distinguish them from the ordinary intaglio printing inks. In the case of wood graining inks where no ground coat is employed, the ink must not bleed or run noticeably along the fibers and pores of the wood, and yet it is desirable that the ink be completely absorbed by the wood and feather out slightly on coming in contact therewith in order to obtain a clear but pleasingly soft appearing grain. Where the graining ink is applied over a ground coat, especially in coating metal, it is essential that the ink should bond well to the ground coat, which means that the solvents in the ink should not deleteriously affect the ground coat. That is, the graining ink should not cause either embossing or shelving (separation of the various films or coats). Likewise, the ink should be capable of bonding well with the top coats of clear lacquer or resin.

This invention provides new substances which are vehicles for graining inks more nearly embodying the desired physical properties enumerated above than graining ink vehicles known in the prior art, and graining inks formulated with these vehicles will bond tightly to all of the usual ground and top coatings without shelving or embossing. They may be retouched and the top coat can be sprayed on them before they are dry. The invention also includes the graining inks formulated with these vehicles.

The substances or compositions of this invention may be broadly defined as the esterification products of aliphatic monohydric alcohol diethers having up to four carbon atoms in each hydrocarbon chain (e. g. butylene or methyl butylene diglycol ethers) and the reaction products of acyclic olefinic acids having less than ten carbon atoms in the carbon chain or anhydrides or esters thereof, with drying oils.

Although any of the commercially available drying oils may be used in preparing these vehicles, linseed, tung and perilla oils give products having the desired physical properties to a greater degree than do the products of other drying oils.

Of the many acyclic olefinic acids, anhydrides and esters thereof which are available, maleic acid or anhydride is especially preferred although its obvious equivalents, such as fumaric and citraconic anhydrides, and crotonic acid, methyl maleate and the like may be substituted in the preparation of these graining ink vehicles.

The aliphatic monohydric alcohol diethers with which the drying oil-olefinic acid adducts are esterified are unusual in their ability to impart relatively strong solvent characteristics and compatibility to the complex esters with many different kinds of resinous or plastic materials without greatly increasing the molecular weights of the esters. Thus, esters made with simple alcohols or even glycol monoethers do not have quite as strong solvent and compatibility characteristics as the esters made with the aliphatic monohydric alcohol diethers, and esters made with high molecular weight alcohols and polyetheralcohols higher than the diether become so viscous that their solvent properties, compatibility and workability in graining inks are lessened. The latter is also true of alcohol diethers which have hydrocarbon chains in excess of four carbon atoms, such as ethyl ether of diamylene glycol. Obviously, glycols and polyhydric alcohols are wholly unsuited for the preparation of these esters as these compounds undergo complex condensations with the drying oil adduct to produce either resinous substances or oils lacking in solvent characteristics. Typical monohydric alcohol diethers suitable for use in this invention are the mono-alkyl ethers of diethylene glycol, dipropylene glycol, ethylene-propylene glycol, dibutylene glycol and the like, and of these the diethylene glycol mono-alkyl ethers, especially the ethyl ether (generally caled "Carbitol"), are preferred.

The reaction of maleic anhydride and its equivalents with tung oil is described in Ellis U. S. Patent No. 2,033,131, issued March 10, 1936, and the reaction of maleic anhydride and its equivalents with linseed oil is described in Clocker U. S. Patent No. 2,188,882, issued January 30, 1940.

The preparation of a typical graining ink vehicle according to this invention is described in the following example, in which the materials are given in parts by weight.

Example 1

| | Parts by weight |
|---|---|
| Linseed oil | 1675 |
| Maleic anhydride | 283 |
| Carbitol | 293 |

The linseed oil was heated to 480° F. and the maleic anhydride added over a period of about 20 minutes. Then the mixture was cooled to 430° F. and the Carbitol added slowly, the mixture being maintained under reflux. After addition of the Carbitol the mixture was maintained at 410° to 420° F. until the reaction product had an acid number of about 22. This consumed a total reaction time of about 4 hours.

The physical properties of the final product were as follows:

| | |
|---|---|
| Viscosity (Gardner Holt Scale) | Z to $Z_2$ |
| Color (Hellige Scale) | 5L |
| Acid number | 22 |
| Density lbs./gal | 8.44 |

The above vehicle showed compatibility with solutions of nitrocellulose in mixtures of toluene, butyl acetate and butanol, and with ethyl cellulose dissolved in a mixture of hydrocarbons and butanol. The product was not compatible with cellulose acetate butyrate solutions, but it gave good compatibility with short oil varnishes (e. g. 8 gallon oil length). It is an excellent plasticizer for such varnishes and also for varnishes made from "Thermoil" (a substitute for wood oil which is made principally from fish oils and is described in Behr U. S. Patent No. 2,166,103, filed July 18, 1939).

By increasing the proportion of alcohol diether in the product (and correspondingly increasing the amount of maleic anhydride) the vehicle acquires greater solvent properties but it dries more slowly. In general, vehicles of this type are oily in nature yet have a considerable solvent power, and they will dry or harden on exposure to the air, especially at elevated temperatures. If used directly on wood they will dry partly by absorption. They permit the use of solvents in compounding the graining inks which do not attack air dried ground coats so that a tight bond between ground and top coats without shelving or embossing may be obtained.

Typical graining inks employing the vehicle described in Example 1 are as follows:

Example 2—Transparent graining ink

| | Parts by weight |
|---|---|
| Blanc fixe | 30.00 |
| Silica aerogel | 2.00 |
| Vehicle from Example 1 | 44.20 |
| Velsicol solvent #4 | 23.80 |
| | 100.00 |

The blanc fixe, silica aerogel and half of the vehicle and solvent were ground together on a roll mill, and then the remainder of the vehicle and solvent were added. The grinding, or mixing, was continued until complete uniformity was obtained. The Velsicol solvent #4 is a mixture of hydrocarbons, largely aromatic and having a boiling range of 170° to 271° C.

Example 3—Black graining ink

| | Parts by weight |
|---|---|
| Carbon black | 12.10 |
| Vehicle from Example 1 | 71.00 |
| Velsicol solvent #4 | 12.10 |
| Oleic acid | 4.80 |
| | 100.00 |

The above materials were mixed on a roll mill until a uniform paste was obtained. Although the ink may be air dried, it can be baked dry in 12 minutes at about 375° F.

Example 4—Walnut graining ink

| | Parts by weight |
|---|---|
| Burnt umber | 19.80 |
| Raw sienna | 18.20 |
| Carbon black | 3.70 |
| Madder lake | 2.00 |
| Bone black | 1.90 |
| Burnt sienna | 0.80 |
| Vehicle from Example 1 | 34.90 |
| Velsicol solvent #4 | 18.70 |
| | 100.00 |

The above materials were ground together on a roll mill in the same manner as described in Examples 2 and 3, and the resulting paste was mixed with the graining ink of Example 2 in the proportion of 84.75 to 15.25 to give the walnut graining ink.

Example 5—Mahogany graining ink

| | Parts by weight |
|---|---|
| Madder lake | 11.44 |
| Carbon black | 6.94 |
| Bone black | 11.04 |
| Burnt sienna | 4.49 |
| Vehicle from Example 1 | 61.13 |
| Velsicol solvent #4 | 4.96 |
| | 100.00 |

After grinding the above materials on a roll mill the resulting paste was further mixed as follows:

| | Parts by weight |
|---|---|
| Paste | 77.20 |
| Velsicol solvent #4 | 22.80 |
| | 100.00 |

Although these graining inks may be applied to wood directly, it is generally desirable to apply a ground coat first, and a ground coat is standard in the decoration of metal surfaces. The ground coat may be any of the compositions usually employed for this purpose such as pigmented oil varnishes and nitrocellulose lacquers, and ground coats containing an alkyd resin binder are especially suitable.

Similarly, any of the standard top coating compositions may be applied over the graining ink, and the clear nitrocellulose lacquers or clear finishes made from maleic gums, urea resins and the like, are suitable.

Theoretically it is possible for the drying oil, olefinic acid and alcohol diether to react only in a certain definite proportion to form a definite compound which is a complex ester. This compound is, of course, a preferred ingredient of the graining ink vehicles described, and it is believed to be new in itself. However, as has been mentioned in connection with Example 1, it is practicable to alter or control the physical characteristics of the graining ink vehicle by varying the proportion of olefinic acid and alcohol diether even though the alteration may cause the formation of complex esters other than, and in addition to, the drying oil-olefinic acid adduct ester of the alcohol diether. In this way the graining ink vehicle may constitute a substance or composition capable of chemical variation, rather than the definite chemical compounds formed by the reaction of the various fatty acid glycerides comprising the drying oil with the olefinic acid, followed by esterification with the alcohol diether.

Although the graining ink vehicles of this invention preferably consist essentially of the drying oil-olefinic acid adduct-alcohol diether ester made as described, it is possible to prepare a satisfactory complex ester by reacting the olefinic acid with the drying oil fatty acids, reacting this product with enough glycerin to esterify the fatty acid radicals and then react this ester with the alcohol diether.

Obviously mixtures of two or more drying oils, olefinic acids and/or alcohol diethers may be used to produce a mixture of a large number of the complex esters contemplated by this invention, and graining inks and graining ink vehicles formulated from such mixtures of complex esters are included within the scope of the invention which should not be limited other than as defined by the appended claims.

I claim:

1. A graining ink comprising a vehicle, pigment finely dispersed therein and a hydrocarbon solvent, said vehicle consisting essentially of the esterification product of an aliphatic monohydric alcohol diether having hydrocarbon chains up to four carbon atoms in length and the product obtained by reaction of an acyclic olefinic acid having less than ten carbon atoms in its carbon chain, anhydrides and esters thereof with a drying oil.

2. A graining ink comprising a vehicle, pigment finely dispersed therein and a hydrocarbon solvent, said vehicle consisting essentially of the esterification product of an aliphatic monohydric alcohol diether having hydrocarbon chains up to four carbon atoms in length and the product obtained by reaction of maleic acid with a drying oil.

3. A graining ink comprising a vehicle, pigment finely dispersed therein and a hydrocarbon solvent, said vehicle consisting essentially of the esterification product of an aliphatic monohydric alcohol diether having hydrocarbon chains up to four carbon atoms in length and the product obtained by reaction of maleic acid with linseed oil.

4. A graining ink comprising a vehicle, pigment finely dispersed therein and a hydrocarbon solvent, said vehicle consisting essentially of the esterification product of the ethyl ether of diethylene glycol and the product obtained by reaction of maleic acid with linseed oil.

RAYMOND A. SWAIN.